(12) United States Patent
Ramamurthy et al.

(10) Patent No.: US 9,544,936 B1
(45) Date of Patent: Jan. 10, 2017

(54) MANAGING BEARERS

(71) Applicant: Sprint Communications Company L.P., Overland Park, KS (US)

(72) Inventors: Suryanarayanan Ramamurthy, Olathe, KS (US); Rajat Kumar, Kansas City, MO (US); Talat Jamshidi, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 103 days.

(21) Appl. No.: 14/021,494

(22) Filed: Sep. 9, 2013

(51) Int. Cl.
*H04W 76/02* (2009.01)

(52) U.S. Cl.
CPC .................................. *H04W 76/025* (2013.01)

(58) Field of Classification Search
CPC .. H04W 72/042; H04W 76/02; H04W 76/025; H04W 76/026; H04W 60/005; H04W 88/02

See application file for complete search history.

(56) References Cited

U.S. PATENT DOCUMENTS

| 2006/0028998 | A1* | 2/2006 | Lioy ..................... H04L 69/167 370/252 |
| 2007/0013936 | A1* | 1/2007 | Ishimoto ..................... 358/1.13 |
| 2008/0049741 | A1* | 2/2008 | Wirtanen .............. H04W 48/14 370/389 |
| 2010/0027448 | A1* | 2/2010 | Puthiyandyil et al. ....... 370/310 |
| 2013/0016696 | A1* | 1/2013 | Adjakple ............ H04W 76/025 370/331 |
| 2014/0105125 | A1* | 4/2014 | Chaponniere et al. ....... 370/329 |

OTHER PUBLICATIONS

3GPP; 3GPP TS 36.331; Jun. 2012; v10.6.0; p. 287.*

* cited by examiner

*Primary Examiner* — Gary Mui
*Assistant Examiner* — Stephen Steiner

(57) ABSTRACT

Systems, methods, and computer-readable media for managing bearers are provided. In a current telecommunications system, a maximum number of bearers are available to simultaneously support various services. By utilizing different internet protocol addresses from differing networks, the maximum number of bearers may be increased. Specifically, by registering a user device with both an IPv4 and IPv6 network, with different IP addresses associated with the respective bearers, a user device may access an additional number of bearers in excess of the previous maximum number of bearers available.

13 Claims, 4 Drawing Sheets

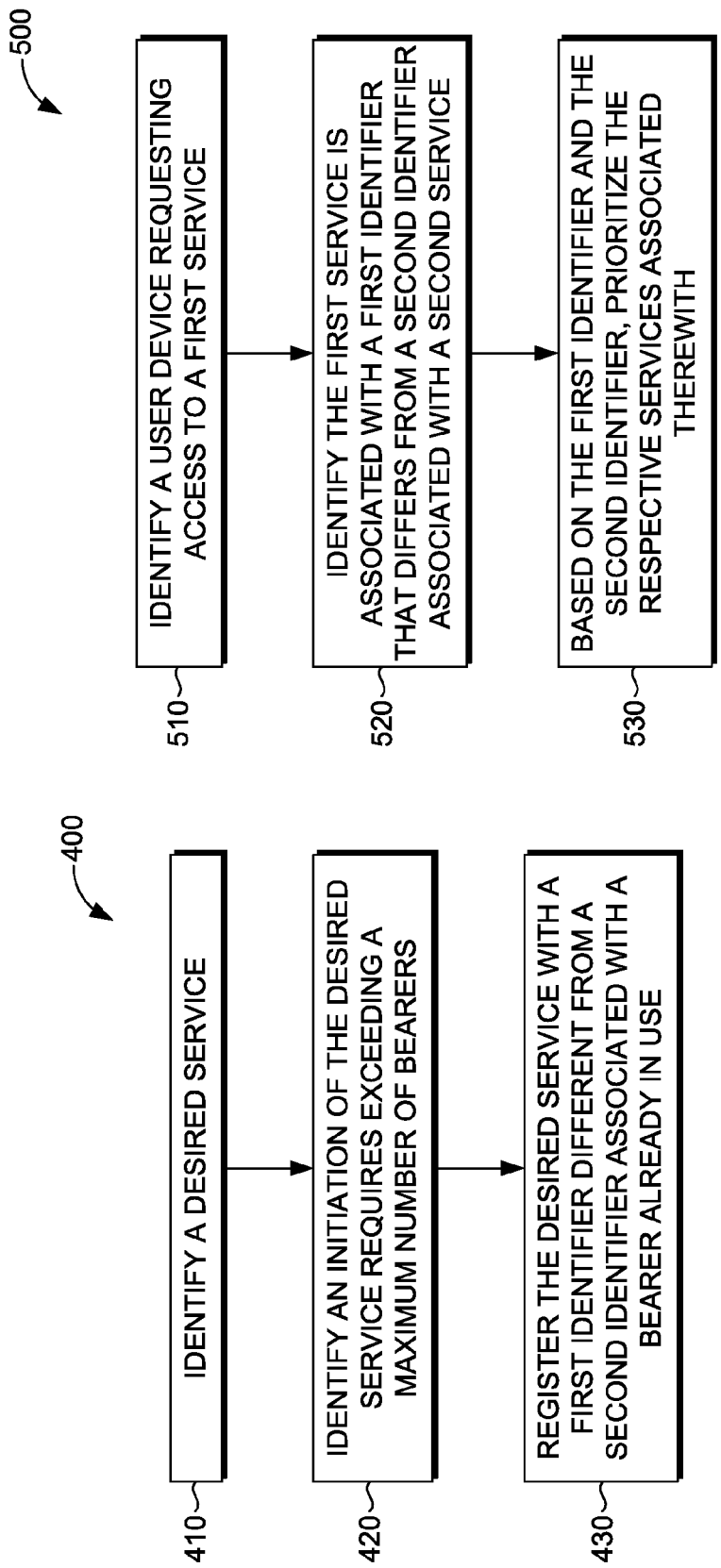

MANAGING BEARERS

BRIEF SUMMARY

A high-level overview of various aspects of the invention is provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, managing bearers. Bearers, as used herein, refer generally to bearer services that allow transmission of information (e.g., information associated with voice calls in a telecommunications network) between network interfaces.

When utilizing various services in a telecommunications network, different bearers are associated with each service. A maximum number of bearers may be utilized at one time. In an embodiment, the maximum number of bearers available at one time is eight. This limitation of a maximum number of bearers applies whether the network is an IPv4 or IPv6 configuration. Thus, there is a limit to the amount of/type of services a user can perform with their mobile device.

BRIEF DESCRIPTION OF THE DRAWINGS

Illustrative embodiments of the present invention are described in detail below with reference to the attached drawing figures, and wherein:

FIG. 4 provides a first exemplary method for managing bearers, in accordance with an embodiment of the present invention;

FIG. 5 provides a second exemplary method for managing bearers, in accordance with an embodiment of the present invention.

DETAILED DESCRIPTION

Figure 1:
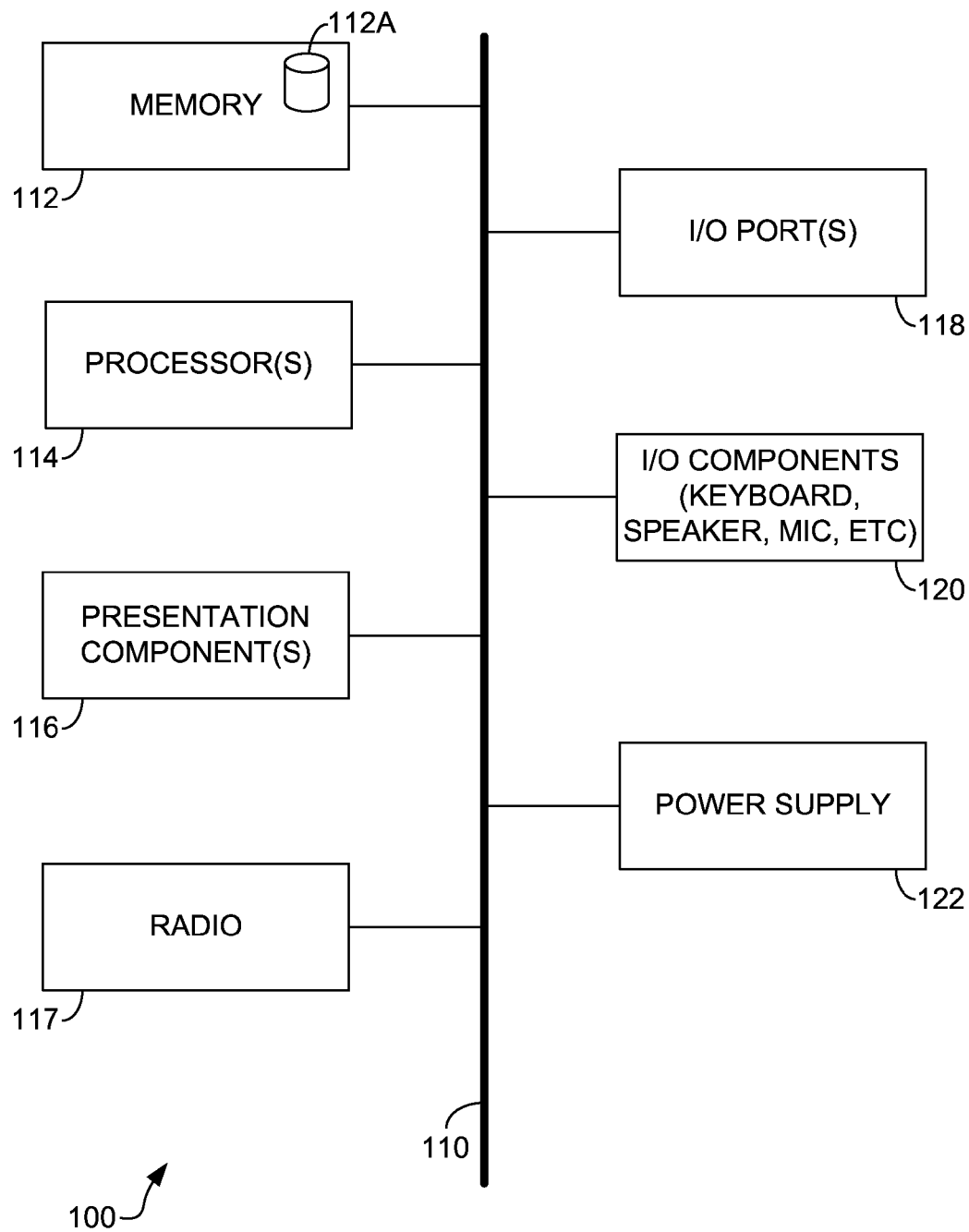
FIG. 1 depicts an exemplary computing device according to embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention may be embodied as, among other things, a method, a system, or set of instructions embodied on one or more computer-readable media. As mentioned, embodiments of the present invention are directed toward managing bearers. When utilizing various services in a telecommunications network, different bearers are associated with each service. A maximum number of bearers may be utilized at one time. In an embodiment, the maximum number of bearers available at one time is eight. This limitation of a maximum number of bearers applies whether the network is an IPv4 or IPv6 configuration. Thus, there is a limit to the amount of/type of services a user can perform with their mobile device.

Accordingly, in one aspect, the present invention is directed to a method of managing bearers. The method includes identifying a desired service, identifying an initiation of the desired services requires exceeding a maximum number of bearers, and registering the desired service with a first identifier different from a second identifier associated with a bearer already in use.

In another aspect, embodiments of the present invention are directed to a method for managing bearers. The method includes identifying a user device requesting access to a first service, identifying the first service is associated with a first identifier that differs from a second identifier associated with a second service, wherein the identifier indicates at least a network associated therewith, and based on the first identifier and the second identifier, prioritizing the respective services associated therewith.

In yet another aspect, embodiments of the present invention are directed to one or more computer-readable storage media having computer-executable instructions embodied thereon that, when executed, perform a method of managing bearers. The method includes identifying a user device requesting access to a first service, wherein the first service is a voice service, identifying the first service is associated with a first identifier that differs from a second identifier associated with a second service, wherein the identifier indicates at least a network associated therewith, and based on the first identifier and the second identifier, prioritizing the respective services associated therewith.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third Generation Mobile Telecommunications
4G Fourth Generation Mobile Telecommunications
APN Access Point Name
CD-ROM Compact Disk Read Only Memory
CDMA Code Division Multiple Access
GPRS General Packet Radio Service
GSM Global System for Mobile communications: originally from Groupe Special Mobile
DVD Digital Versatile Discs
EEPROM Electrically Erasable Programmable Read Only Memory
HARQ Hybrid Automatic Repeat Request
HLR Home Location Register
HSDPA High-Speed Downlink Packet Access
LTE Long Term Evolution
PA Power Amplifier
PC Personal Computer
PDA Personal Digital Assistant
RAM Random Access Memory ROM Read Only Memory
TDMA Time Division Multiple Access
UMTS Universal Mobile Telecommunications System
VOIP Voice Over Internet Protocol
VoLTE Voice Over LTE
WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention provide systems, methods, and computer-readable media for managing bearers. Bearers, as used herein, refer generally to bearer services that allow transmission of information (e.g., information associated with voice calls in a telecommunications network) between network interfaces. When utilizing various services in a telecommunications network, different bearers are associated with each service. A maximum number of bearers may be utilized at one time. In an embodiment, the maximum number of bearers available at one time is eight. This limitation of a maximum number of bearers applies whether the network is an IPv4 or IPv6 configuration. Thus, there is a limit to the amount of/type of services a user can perform with their mobile device.

As telecommunications systems migrate to an IPv6 configuration, both IPv4 and IPv6 may remain available for use. Regardless of the configuration, only eight (8) bearers are available for use at one time. Typically, the eight bearers are used up quickly for various services that are standing on a mobile device and additional services desired by a user. A service, as used herein, refers generally to any action performed by a mobile device that requires use of a bearer. Exemplary services include, but are not limited to, Internet access, voice, video, streaming, text messaging, over-the-air capabilities, phone as modem (PAM), voice over long term evolution (VoLTE), QChat, and the like.

Bearers are typically associated with a QCI label (quality of service class identifier). The QCI indicates various information including, but not limited to, the bit rate of the bearer, a priority of the bearer (as discussed in further detail below), packet error loss rates, and the like. Put simply, each desired service is mapped to a single QCI label according to a level of service required by the desired service. For example, and as is recognized in the art, QCI-1 may be prioritized to a higher priority than QCI-9 so a voice call would like be mapped to QCI-1 rather than QCI-9, assuming availability. This is such because it is much more concerning to experience a high rate of packet loss during a voice call, which would result in poor quality of the call (e.g., dropping the call, cutting out, excessive feedback, etc.), rather than during a data session (e.g., an Internet browsing session) where packet loss may result in increased latency but still provides the user with the desired service.

By way of further background, bearers are typically referred to as default bearers or dedicated bearers. A default bearer refers generally to a bearer that is established with a mobile device connects to a packet data network (PDN) and remains established throughout the lifetime of the connection to the PDN. Any additional bearers that are established for the same PDN connection are referred to as dedicated bearers. Each PDN is associated with a different default bearer and different dedicated bearers.

Each bearer is typically associated with an IP address associated with the network. For instance, the IP address may indicate an IPv4 configuration, an IPv6 configuration, or the like. Each bearer may also be associated with a priority. The priority may be based on the network, the associated service, or the like. For instance, a voice bearer may be associated with a higher priority than a bearer associated with a browsing session. A higher priority, as used herein, refers generally to a ranking of bearer that results in specialized treatment. For instance, a bearer with a higher priority is communicated in a manner such that packet loss is decreased (e.g., each packet is communicated).

In a specific example of bearer usage, assume a user has established a browsing session (1 bearer required), a Qchat (3 bearers required), and a VoLTE session (2 bearers required). This has already taken 6 bearers of the available 8 bearers for the mobile device. Further assume that the user would like to initiate a desired service that requires an additional 3 bearers. This would exceed the maximum number of bearers (8) available to the user. Typically, a user would not be able to initiate this service or, alternatively, an existing service would be terminated in order to free up bearers for the new desired service.

The present invention provides access to additional bearers without terminating existing services. Internet protocol addresses vary for IPv4 and IPv6 networks. Bearers may be associated with a user device from each network. Accordingly, a user device may be associated with 8 available bearers on an IPv4 network and an additional 8 bearers on an IPv6 network, each having different IP addresses. Thus, the IP address would identify whether the service is associated with either an IPv4 or IPv6 configuration.

Initially, a user device may recognize that it is out of bearers or that it requires more bearers than are available to initiate a desired service. When this happens, the user device may register with the alternate network. For example, if each bearer of the IPv4 network is occupied, the user device may register with the IPv6 network, and vice versa.

Once a user device has registered with the alternate network, the eNodeB (of a 4G telecommunications network) may receive a signal from a bearer indicating whether the bearer is associated with the IPv4 or IPv6 network. The eNodeB may utilize this information to determine a priority of the bearer. As previously discussed, the IPv6 network may automatically receive a higher priority. Alternatively, the eNodeB may utilize different information to determine a priority of the bearer such as the service associated with the bearer.

In an alternate embodiment, the eNodeB may recognize, alternative to the IP address or network, a marker of the signal. A Differentiated Services Code Point (DSCP) marker may be utilized in order to differentiate bearers. This may be utilized in a single network (such as just in the IPv6 network) in order to increase the maximum number of bearers (e.g., from 8 to 16). This will be useful when the IPv4 network is phased out and only the IPv6 network exists. Thus, a user will still be able to double the amount of available bearers even though two networks are not available.

In the telecommunications, a packet gateway may identify the combination of the network identifier (e.g., IPv4 or IPv6) and APN to decide a quality of service (QoS) for each service rather than by the APN itself. Thus, combinations of APN1-IPv4, APN1-IPv6, APN2-IPv4/28, APN2-IPv4/32 may be considered as a factor to decide the QoS. With this system, the limitation of 8 bearers can be increased to 16 or more bearers if the user device uses the same APN and a different IP address for each service.

Figure 2:
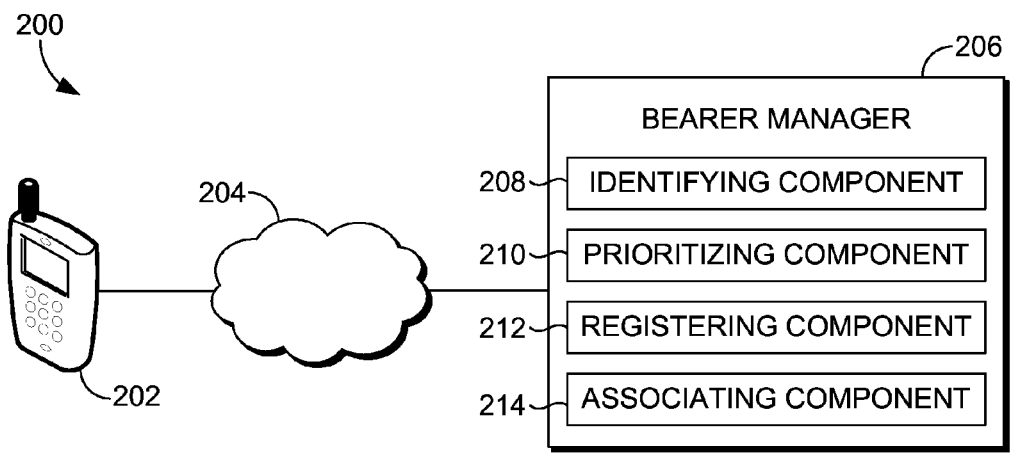
FIG. 2 depicts an illustrative operating system for carrying out embodiments of the present invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment 200 be interpreted as having any dependency or requirement relating to any one or combination of components illustrated.

In the network environment 200, one or more user devices 202 may communicate with other devices, such as mobile devices, servers, etc. The user device 202 may take on a variety of forms, such as a personal computer (PC), a laptop computer, a tablet, a netbook, a mobile phone, a Smart phone, a personal digital assistant (PDA), or any other device that is cable of communicating with other devices. For example, the user device 202 can take on any form, such as, for example, a mobile device or any other computing device capable of wirelessly communicating with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device can be any mobile computing device that communicates by way of, for example, a 3G or 4G network.

The user device 202 can utilize network 204 to communicate with other computing devices (e.g., a mobile device(s), a server(s), a personal computer(s), etc.). In embodiments, network 204 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 204 can include multiple networks, as well as being a network of networks, but is shown in more simple form so as to not obscure other aspects of the present invention. Network 204 can be part of a telecommunications network that connects subscribers to their immediate service provider. In embodiments, network 204 can be associated with a telecommunications provider that provides services to user devices, such as user device 202. For example, the network 204 may provide voice services to user devices or corresponding users that are registered or subscribed to utilize the services (e.g., the network 204) provided by a telecommunications provider. The network 204 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

The network environment 200 may include a database (not shown). The database may be similar to the memory component 112 of FIG. 1 and can be any type of medium that is capable of storing information. The database can be any collection of records. In one embodiment, the database includes a set of embodied computer-executable instructions that, when executed, facilitate various aspects disclosed herein. These embodied instructions will variously be referred to as "instructions" or an "application" for short.

The network environment 200 also includes a bearer manager 206. The bearer manager 206 is configured for various tasks and may be associated with each of the user device 202, the network 204, and/or additional components of the network environment 200 that may not be pictured. For example, the bearer manager 206 may be associated with the user device 202 such that the user device is capable of recognizing bearer capacities. Additionally, the bearer manager 206 may be associated with an eNodeB of network 204 such that the eNodeB is capable of identifying bearer differentiators.

The bearer manager 206 comprises an identifying component 208, a prioritizing component 212, a registering component 212, and an associating component 214. Each component may be utilized in any order depending on the association of the bearer manager 206. For instance, if the bearer manager 206 is associated with the user device 202 then the user device will likely utilize the registering component 212 to register with a network while a different association with, for example, an eNodeB may call on the prioritizing component 210.

The identifying component 208 is configured for, among other things, identifying various features of bearers. For instance, the identifying component 208 may identify a network associated with a bearer, a service associated with a bearer, an IP address of a bearer, a QoS of a bearer (if applicable), and the like.

The prioritizing component 210 is configured for, among other things, prioritizing bearers. As discussed in detail above, bearers may be prioritized based on numerous factors. For example, the network associated with the bearer may determine priority or the service associated with the bearer may determine priority.

The registering component 212 is configured for, among other things, registering a user device with an alternate network once all of the available bearers are maxed out on the initial network or when a desired service would require more bearers than is what available on the initial network. Additionally, a user may wish to initiate a service that requires a different network, such as VoLTE. VoLTE requires an IPv6 network so, even if the user has not yet maxed out their 8 available bearers on the IPv4 network, they will still require registration with the IPv6 network in order to initiate VoLTE. The registering component 212 simply registers the user device 202 with the alternate network, whether it is the IPv4 or IPv6 network.

The associating component 214 is configured for, among other things, associating one or more services with one or more bearers. Thus, a bearer may be associated with an appropriate desired service by the associating component 214.

In application, the user device 202 will either max out available bearers or desire to initiate a service that requires more bearers than are available on a current network (e.g., IPv4). Upon identifying the need for additional bearers, the user device 202 may register with an alternate network, different from the current network (e.g., IPv6).

Once registered with the alternate network, an eNodeB, for example, may identify the bearer is associated with the alternate network, among other things. This information may be used to determine a priority of the bearer. By allowing the user device 202 to register with different networks and identify itself as having an additional bearer, users may be able to simultaneously run at least double the services that they would otherwise be able to run.

Figure 3:
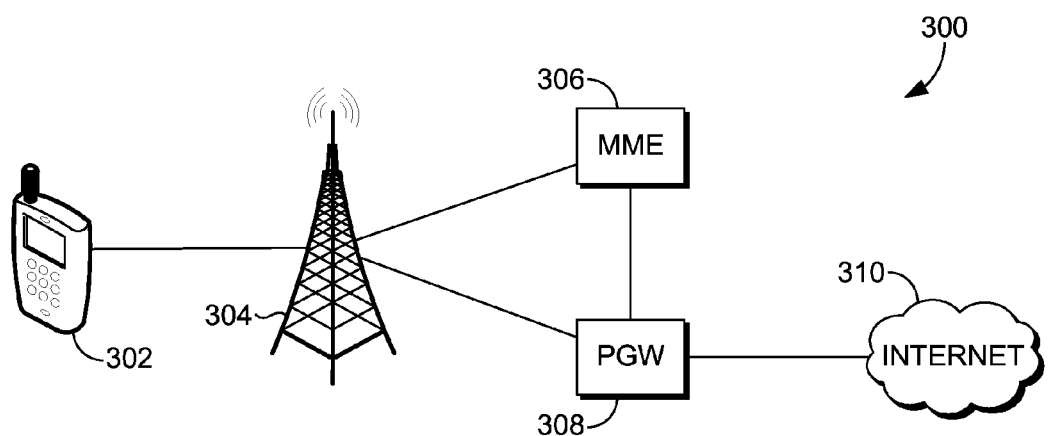
FIG. 3 depicts an illustrative operating system for carrying out embodiments of the present invention.

FIG. 3 provides a specific telecommunications environment 300 in which the present invention may be applied. The telecommunications environment 300 may be a 4G telecommunications network, as indicated by the presence of an eNodeB 304. A user device 302 may register with an IPv4 or IPv6 network, or both, and proceed to transmit data through the telecommunications environment 300 in a normal manner. The eNodeB 304 facilitates the transmission by being configured to identify the special registration and differentiate between bearers of an IPv4 network and an IPv6 network and prioritize each. This ensures that even though there are more bearers associated with the user device 302, they will still be prioritized and communicated as efficiently as if the number of available bearers was not doubled. Upon identifying the differentiating markers of the bearer, data is communicated through the mobile management entity (MME) 306, packet gateway (PGW) 308, and to the Internet 310 (if applicable).

Turning now to FIG. 4, a flow diagram is shown illustrating a first exemplary method 400 for managing bearers in accordance with an embodiment of the present invention. Initially, at block 410, a desired service is identified. At block 420 it is identified that initiation of the desired service requires exceeding a maximum number of bearers. At block 430 the desired service is registered with a first identifier different from a second identifier associated with a bearer already in use.

Turning now to FIG. 5, a flow diagram is shown illustrating a second exemplary method 500 for managing bearers, in accordance with an embodiment of the present invention. At block 510 a user device requesting access to a first service is identified. At block 520 it is identified that the first service is associated with a first identifier that differs from a second identifier associated with a second service. At block 530 the first service and second service are prioritized based on the first identifier and second identifier.

Figure 6:
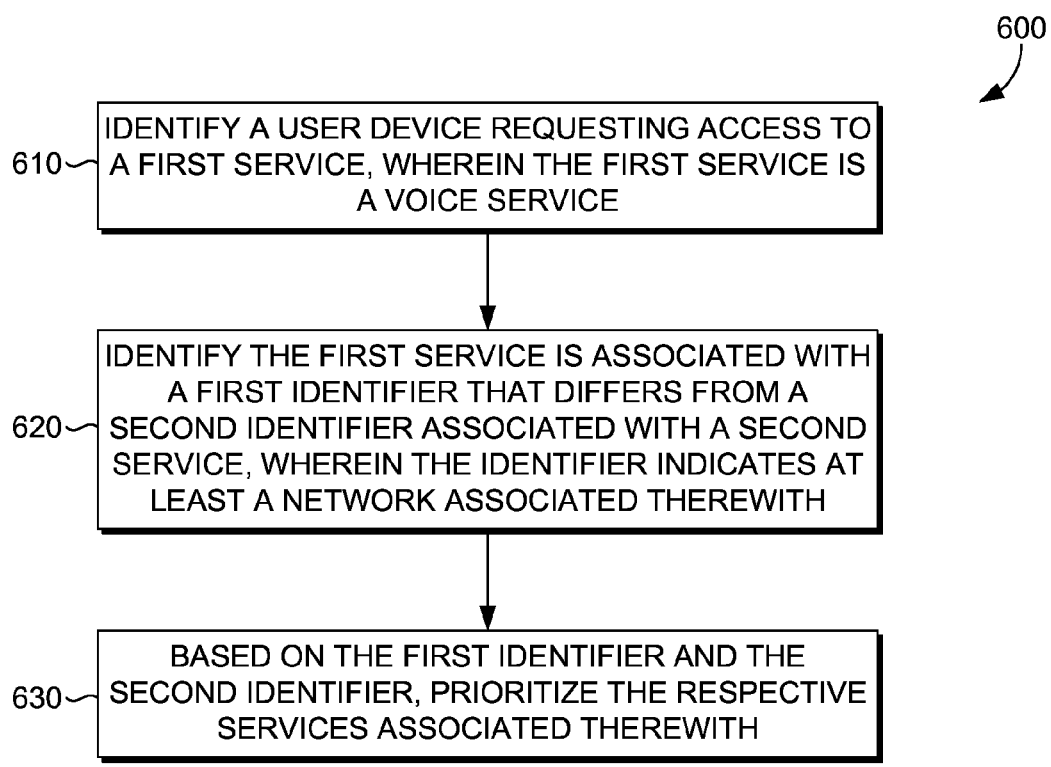
FIG. 6 provides a third exemplary method for managing bearers, in accordance with an embodiment of the present invention.

Turning now to FIG. 6, a flow diagram is shown illustrating a second exemplary method 600 for managing bearers, in accordance with an embodiment of the present invention. At block 610 a user device requesting access to a first service is identified, wherein the first service is a voice service. At block 620 it is identified that the first service is associated with a first identifier that differs from a second identifier associated with a second service, wherein each identifier indicates at least a network associated therewith. At block 630 the first service and second service are prioritized based on the first identifier and second identifier.

It will be understood by those of ordinary skill in the art that the order of steps shown in the methods 400 of FIG. 4, 500 of FIG. 5, and 600 of FIG. 6 is not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method for managing bearers, the method comprising:
   identifying a desired service;
   identifying an initiation of the desired service requires exceeding a maximum number of bearers permitted on an initial network on which the user device is currently registered;
   in response to identifying that the initiation of the desired service on the initial network requires exceeding a maximum number of bearers permitted on the initial network on which the user device is currently registered, concurrently registering the user device with an alternate network in order to access one or more additional bearers;
   registering the desired service with a first identifier associated with a bearer to be used on the alternate network, wherein the first identifier is different from a second identifier associated with a bearer in use on the initial network, wherein each of the first identifier and the second identifier indicates an internet protocol (IP) address, and wherein each IP address identifies an IP version 4 (IPv4) or IP version 6 (IPv6) configuration of the alternate network and the initial network, respectively; and
   prioritizing the desired service based on the IPv4 or IPv6 configuration identified via the IP address of the first identifier associated with the desired service registered with the alternate network.

2. The method of claim 1, wherein the maximum number of bearers is eight.

3. The method of claim 1, wherein the desired service is voice service.

4. The method of claim 1, wherein a bearer associated with a voice service is prioritized above a bearer associated with a non-voice service.

5. The method of claim 1, wherein each of the identifying and registering steps are performed by a user device.

6. A method for managing bearers, the method comprising:
   identifying a user device requesting access to a first service on a current network that is a mobile telecommunications network utilizing Internet Protocol version 4 (IPv4) or Internet Protocol version 6 (IPv6), wherein the first service is in addition to a second service being accessed via the user device on the current network, and wherein the second service is registered with an identifier that indicates an IP address identifying a network configuration of the current network;
   upon recognizing the first service requires more bearers than are available on the current network, concurrently registering the user device with the second network to access one or more additional bearers;
   registering the first service with an identifier that indicates an IP address identifying a network configuration of the second network, wherein the network configuration of the second network is not the same as the current network, and wherein the identifier of the first service is different than the identifier of the second service; and
   based on the identifier of the first service that indicates the IP address identifying the network configuration of the second service is not the same as the network configuration of the current network by which the second service is being accessed, prioritizing the respective services associated therewith.

7. The method of claim 6, wherein the first service is a voice service.

8. The method of claim 6, wherein an IPv6 network is prioritized over an IPv4 network.

9. The method of claim 6, wherein the first identifier is associated with a different access point network (APN) than the second identifier.

10. One or more non-transitory computer-readable storage media having computer-executable instructions embodied thereon that, when executed via one or more processors, perform a method for managing bearers, the media comprising:
    identify a user device requesting access to a first service on a current network on which the user device is registered, wherein the first service is a voice service to be used by the user device in addition to a second service in use on the current network, wherein the current network is a fourth generation mobile telecommunications network utilizing IPv4;
    recognize the first service requires more bearers than are available on the current network;
    in response to recognizing the first service requires more bearers than are available on the current network, concurrently register the user device with an alternative network;
    register the first service with a first identifier that indicates an IP address identifying an IPv6 configuration of the alternate network, wherein the first identifier is different than a second identifier that is registered with the second service in use on the current network utilizing IPv4, and wherein the second identifier indicates an IP address that identifies the IPv4 configuration of the current network; and
    prioritize the first service based on the IPv6 configuration identified via the IP address indicated by the first identifier associated with the first service.

11. The media of claim 10, wherein an IPv6 network is prioritized over an IPv4 network.

12. The media of claim 10, wherein the first identifier is associated with a different access point name (APN) than the second identifier.

13. The media of claim 10, wherein the first service is a voice service.

* * * * *